(12) United States Patent
Metodiev

(10) Patent No.: US 7,834,298 B2
(45) Date of Patent: Nov. 16, 2010

(54) ADJUSTABLE ELECTROMAGNETIC SEALING DEVICE

(75) Inventor: Mario Metodiev, West Islip, NY (US)

(73) Assignee: Ultraflex International, Inc., Ronkonkoma, NY (US)

( * ) Notice: Subject to any disclaimer, the term of this patent is extended or adjusted under 35 U.S.C. 154(b) by 207 days.

(21) Appl. No.: 11/944,918

(22) Filed: Nov. 26, 2007

(65) Prior Publication Data

US 2009/0134148 A1    May 28, 2009

(51) Int. Cl.
*H05B 6/10* (2006.01)
(52) U.S. Cl. .................................. 219/633; 219/604
(58) Field of Classification Search .............. 219/633, 219/632, 604, 634, 647
See application file for complete search history.

(56) References Cited

U.S. PATENT DOCUMENTS

| | | | | |
|---|---|---|---|---|
| 2,966,571 A * | 12/1960 | Markert, Jr | ................. | 219/604 |
| 3,461,014 A | 8/1969 | James | | |
| 3,708,951 A | 1/1973 | Folk et al. | | |
| 3,727,022 A * | 4/1973 | Hamilton | ..................... | 219/633 |
| 3,748,422 A * | 7/1973 | Schafer | ...................... | 219/633 |
| 3,808,074 A * | 4/1974 | Smith et al. | .................. | 156/69 |
| 4,017,704 A * | 4/1977 | Collins et al. | ............... | 219/660 |
| 4,237,360 A * | 12/1980 | Pohlenz | ...................... | 219/604 |
| 4,704,509 A * | 11/1987 | Hilmersson et al. | ......... | 219/633 |
| 4,891,484 A * | 1/1990 | Waggott et al. | ............. | 219/645 |
| RE33,467 E * | 12/1990 | Steck et al. | .................... | 53/451 |
| D398,314 S | 9/1998 | Herzog | | |
| 6,104,013 A * | 8/2000 | Miller | ........................ | 219/633 |
| 6,362,461 B1 | 3/2002 | Wiening et al. | | |
| 6,552,312 B2 * | 4/2003 | Hammen et al. | ............ | 219/633 |
| 6,629,399 B2 * | 10/2003 | Sarles et al. | ................ | 53/329.2 |
| 6,633,480 B1 | 10/2003 | Herzog | | |
| 6,649,022 B2 | 11/2003 | Hammen et al. | | |
| 6,713,735 B2 | 3/2004 | Terano | | |
| 6,732,495 B2 | 5/2004 | Sarles et al. | | |
| 6,875,965 B2 * | 4/2005 | Herzog | ........................ | 219/604 |
| 2003/0168444 A1* | 9/2003 | Liakopoulos | ................ | 219/633 |
| 2004/0053718 A1* | 3/2004 | Pang | ............................ | 474/87 |
| 2004/0164070 A1* | 8/2004 | Terano | ........................ | 219/633 |
| 2004/0210282 A1* | 10/2004 | Flock et al. | ................... | 607/96 |
| 2006/0049179 A1 | 3/2006 | Andersson | | |

* cited by examiner

*Primary Examiner*—Tu B Hoang
*Assistant Examiner*—Hemant Mathew
(74) *Attorney, Agent, or Firm*—Hoffmann & Baron, LLP

(57) ABSTRACT

The present invention is an inductive sealing unit, which includes a conductive coil assembly that has at least two sections. At least one of the sections is adjustable with respect to the other. Each section has a magnetic flux concentrator, such as a ferrite core. A flexible conductive coil, such as litz wire, is disposed with respect to the magnetic flux concentrator to provide an electromagnetic field which induces heat sufficient to seal an object. The assembly can be adjusted to accommodate different size objects to be sealed.

24 Claims, 5 Drawing Sheets

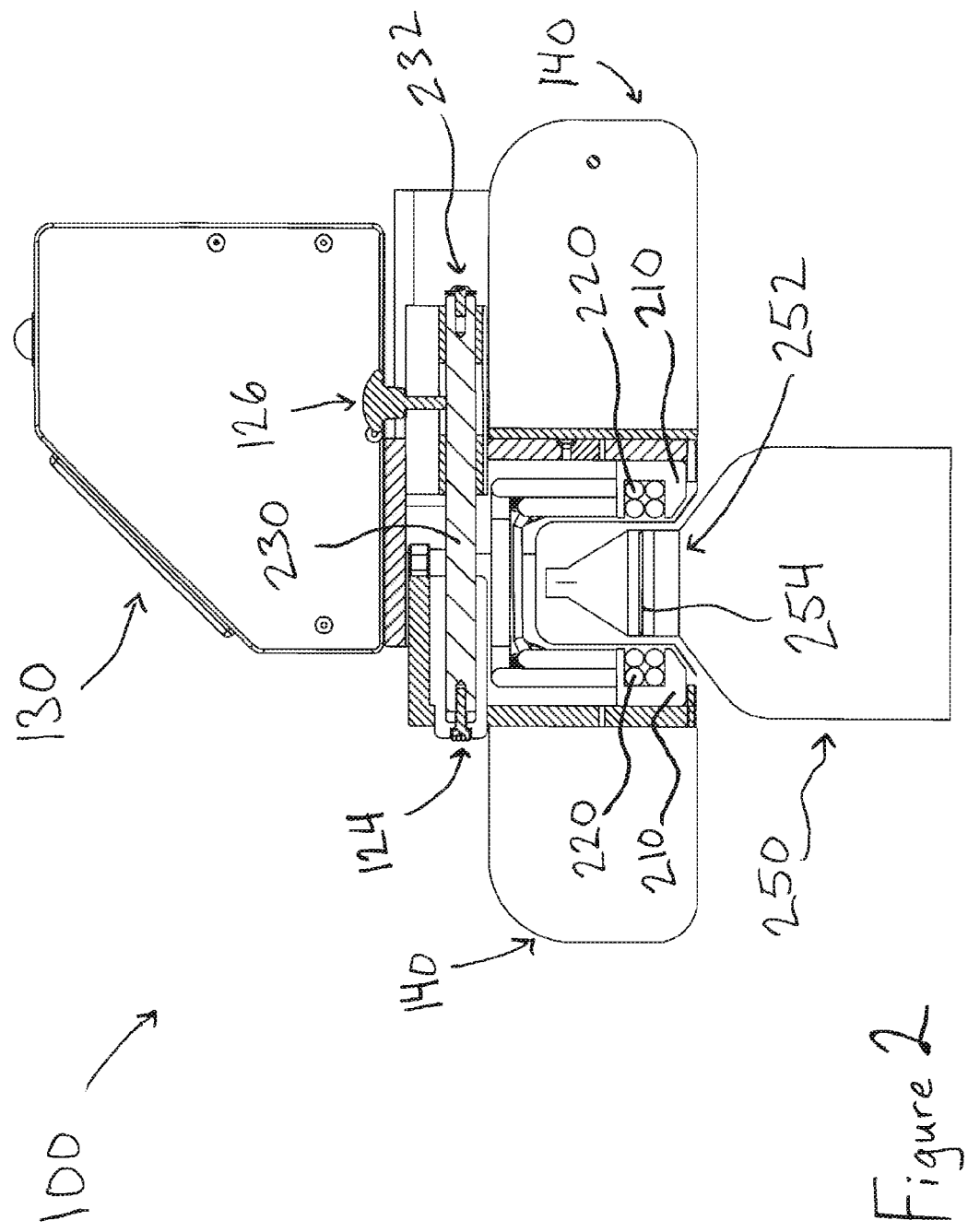

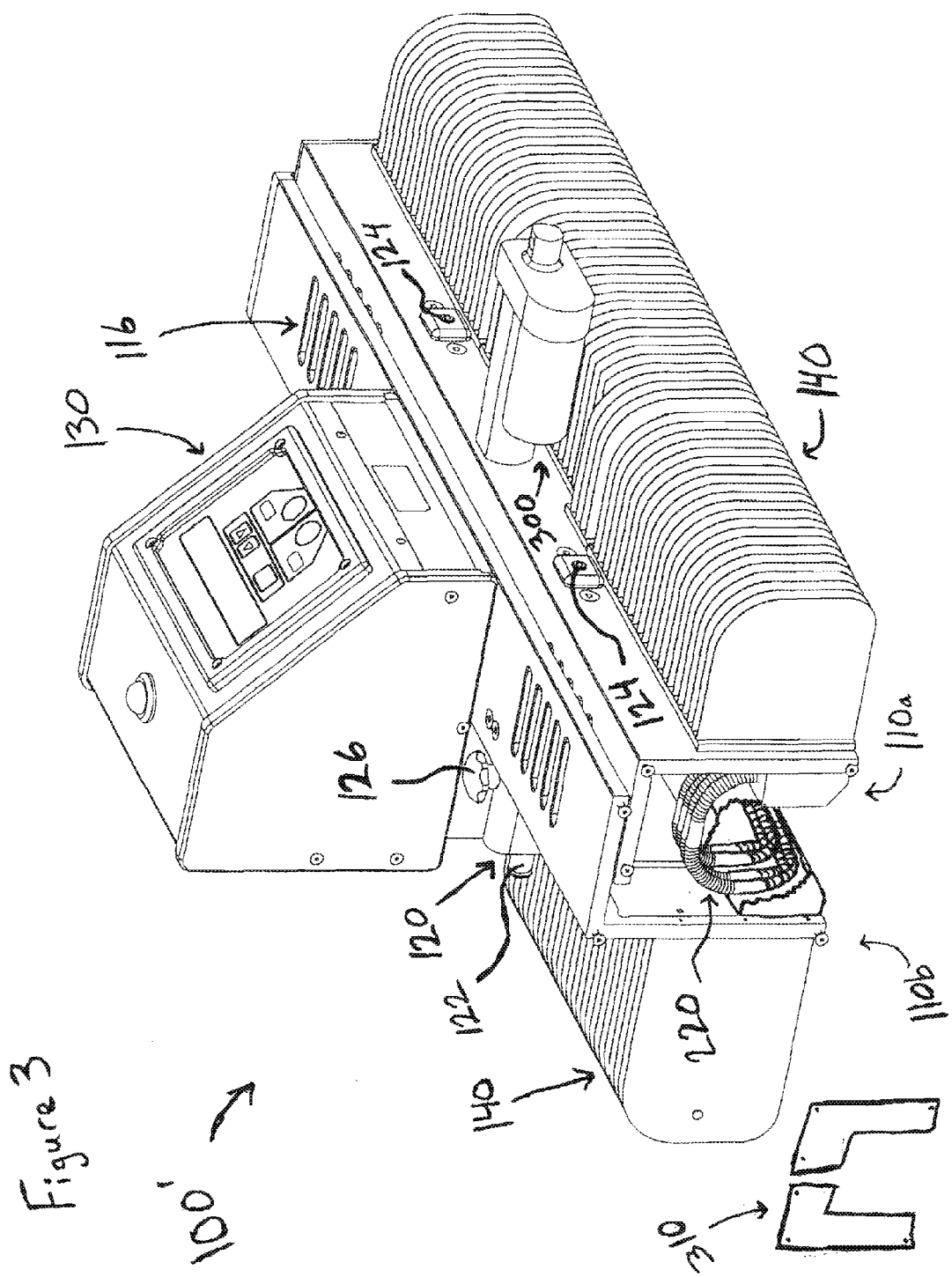

ADJUSTABLE ELECTROMAGNETIC SEALING DEVICE

BACKGROUND

The present invention relates to inductive sealing units, and, specifically, to an inductive sealing unit that accommodates different size objects to be sealed.

Inductive sealing units are used to secure metal foil seals to the cap of a container. The metal foil seals generally have sealing material, such as a thermoplastic resin, disposed on one side. The caps with the metal foil seals are seated over the openings of the containers to be sealed. The side of the metal foil soil with the sealing material generally contacts the container so that the metal foil covers the opening of the container. The container, metal foil seal, and cap are passed through an electromagnetic field generated by applying a high frequency current to a conductive coil of the inductive sealing unit. The electromagnetic field inductively heats the metal foil seal, which in turn heats and cures the sealing material to secure the metal foil seal to the container; thereby sealing, hermetically sealing, or tamper-proof sealing the container. Generally, the metal foil seal must come in close proximity to the source of the electromagnetic field to ensure heat sufficient to seal the container is generated in the metal foil.

Conventional inductive sealing units are typically designed for caps with specific dimensions. In recent years, caps of containers have taken many shapes and sizes and it is not uncommon for a manufacturer to seal containers with an assortment of cap configurations. Caps of different sizes and shapes require manufacturers to use different inductive sealing units to ensure that the metal foil is in close proximity to the electromagnetic field. As a result, each time a manufacture wishes to seal a container that has a cap of with different dimensions, the manufacturer must generally stop the assembly line and replace the inductive sealing unit with another inductive sealing unit that is suitable for the sealing the container. Thus, manufactures are generally required to have a multitude of inductive sealing units for sealing containers having caps with different dimensions.

These conventional sealing units are burdensome to manufacturers that seal containers with different size caps. Requiring a manufacturer to stop the assembly line and replace the sealing unit with another sealing unit results in tremendous inefficiencies. These inefficiencies can increase the production times for sealing containers and increase the cost associated with manufacture of sealed containers with different size caps.

What is desired is an inductive sealing unit that can accommodate different size objects to be sealed.

SUMMARY OF THE INVENTION

The present invention is an inductive sealing unit. The inductive sealing unit includes a conductive coil assembly that includes at least two sections. At least one of the sections is adjustable with respect to the other. Each section has a magnetic flux concentrator, such as a ferrite core, associated therewith. A flexible conductive coil, such as litz wire, is disposed with respect to the magnetic flux concentrator to provide an electromagnetic field that induces heat sufficient to seal an object. The assembly can be adjusted to accommodate different size objects to be sealed.

The sections can form a recess, which can be configured as a channel. The dimensions of the recess are adjustable to accommodate different size objects to be sealed. The magnetic flux concentrator of the conductive coil assembly can have substantially parallel ends and a connecting section that is generally orthogonal to the ends and which connects to the ends to form a cavity in which the flexible conductive coil can be disposed.

The inductive sealing unit can include an adjustment mechanism for adjusting at least one of the sections with respect to the other. The adjustment mechanism can include a positioning member that connects the at least two sections. The positioning member can be secured to one of the sections and movably attached to another of the sections to allow at least one of the sections to move towards and away from the other. In some embodiments, the adjustment mechanism can include a locking mechanism to selectively lock the positioning member such that the sections are fixedly positioned. In some embodiments, the adjusting member can include an actuator that is communicatively coupled to the positioning member. The actuator controls the position of at least one of the sections with the positioning member to move the at least one of the sections towards and away from the other. The adjustment mechanism can be at least one of a pneumatic, hydraulic, or pulley device.

The present invention includes a method of inductively sealing different size objects. The method can include providing an inductive sealing unit having at least two sections. At least one of the sections is adjustable with respect to the other to accommodate different size objects to be sealed. Each of the sections includes a magnetic flux concentrator and a flexible conductive coil disposed with respect to the concentrator. The method also includes adjusting at least one of the sections to move the at least one of the sections towards or away from the other to position the sections in a manner to induce heat sufficient to seal an object with known dimensions. The adjusting can be performed manually or automatically. The method further includes supplying an electric current to the flexible conductive coil to induce an electromagnetic field with the sections and sealing the object with known dimensions based on the electromagnetic field.

The method can also include readjusting at least one of the sections to move the at least one of the sections towards or away from the other to position the sections in a manner to induce heat sufficient to seal another object with known dimensions and sealing the other object with known dimensions based on the electromagnetic field. The method can also include passing an object under the sections using a conveyer belt. The sections can form a channel and at least a portion of the object extends into the channel while passing the inductive sealing unit. The passing and sealing can be performed concurrently.

The present invention enables manufacturers to seal containers having a multitude of cap shapes and sizes without requiring the manufacturer to replace the inductive sealing unit. The present invention allows the manufacturer to simply adjust the sealing unit according to the dimensions of the cap to ensure that the metal foil is in close proximity to the electromagnetic field source so that the metal foil seal is heated sufficiently. Thus, a single inductive sealing unit can be used to seal containers that have a multitude of cap configurations. This eliminates or reduces the inefficiencies associated with conventional inductive sealing units. The present invention eliminates the requirement that manufacturers purchase several different sealing units for each cap size or shape; thereby reducing the capital equipment expenditures of the manufacturers. As a result, the present invention can save manufacturers time and costs associated with sealing containers with different size caps.

The preferred embodiments of the inductive sealing unit, as well as other objects, features and advantages of the present invention will be apparent from the following detailed description, which is to be read in conjunction with the accompanying drawings. The scope of the invention will be pointed out in the claims.

BRIEF DESCRIPTION OF THE DRAWINGS

FIG. 2 depicts a perspective view of a preferred embodiment of an inductive sealing unit with an end plate removed to show a conductive coil;

FIG. 3 depicts a cross sectional view of a preferred embodiment of an inductive sealing unit.

DETAILED DESCRIPTION OF PREFERRED EMBODIMENTS

Preferred embodiments of the present invention relate to an induction sealing unit that can be adjusted to accommodate different size objects.

Figure 1A:
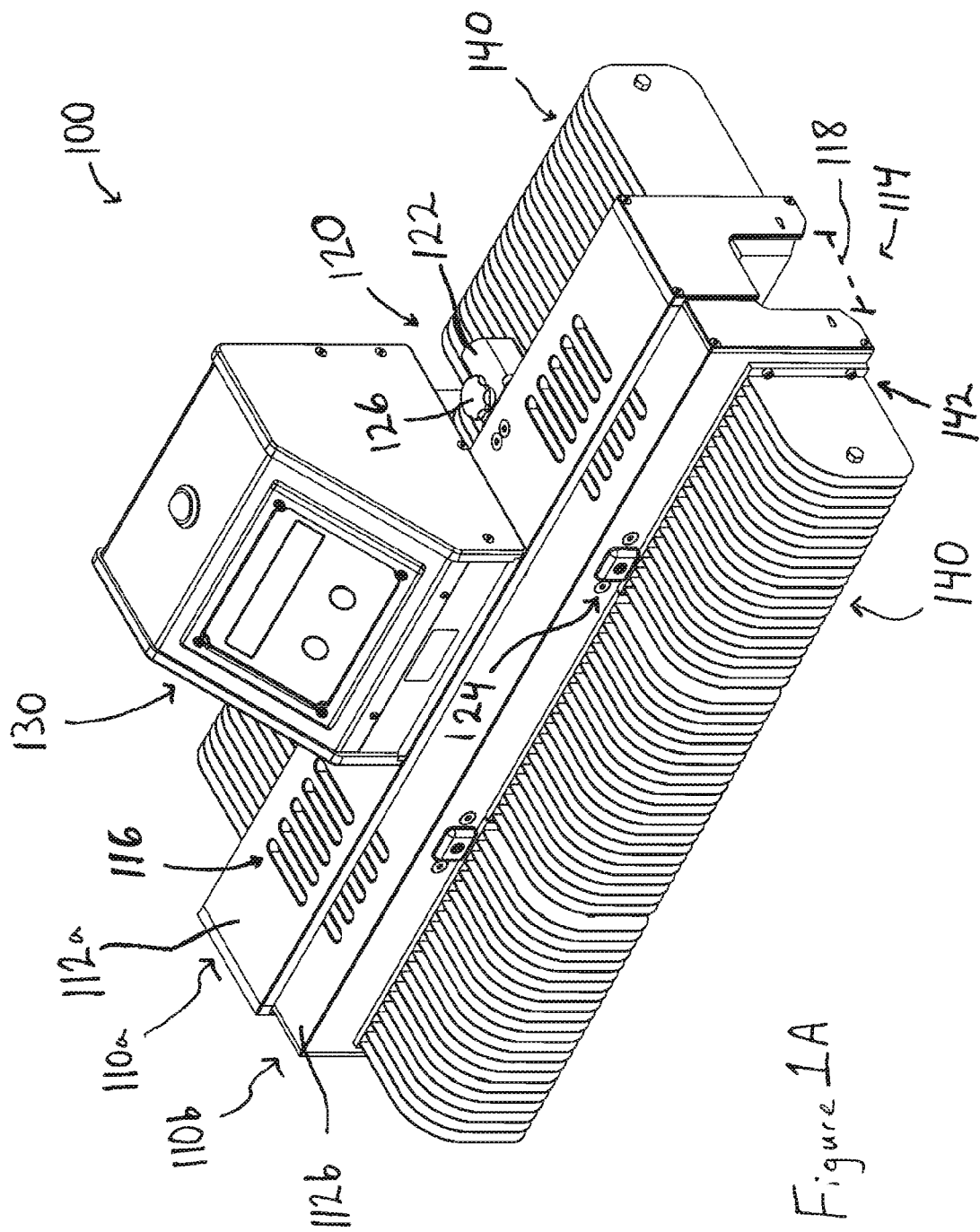
FIG. 1A depicts a perspective view of an inductive sealing unit in accordance with a preferred embodiment of the present invention.
Figure 1B:
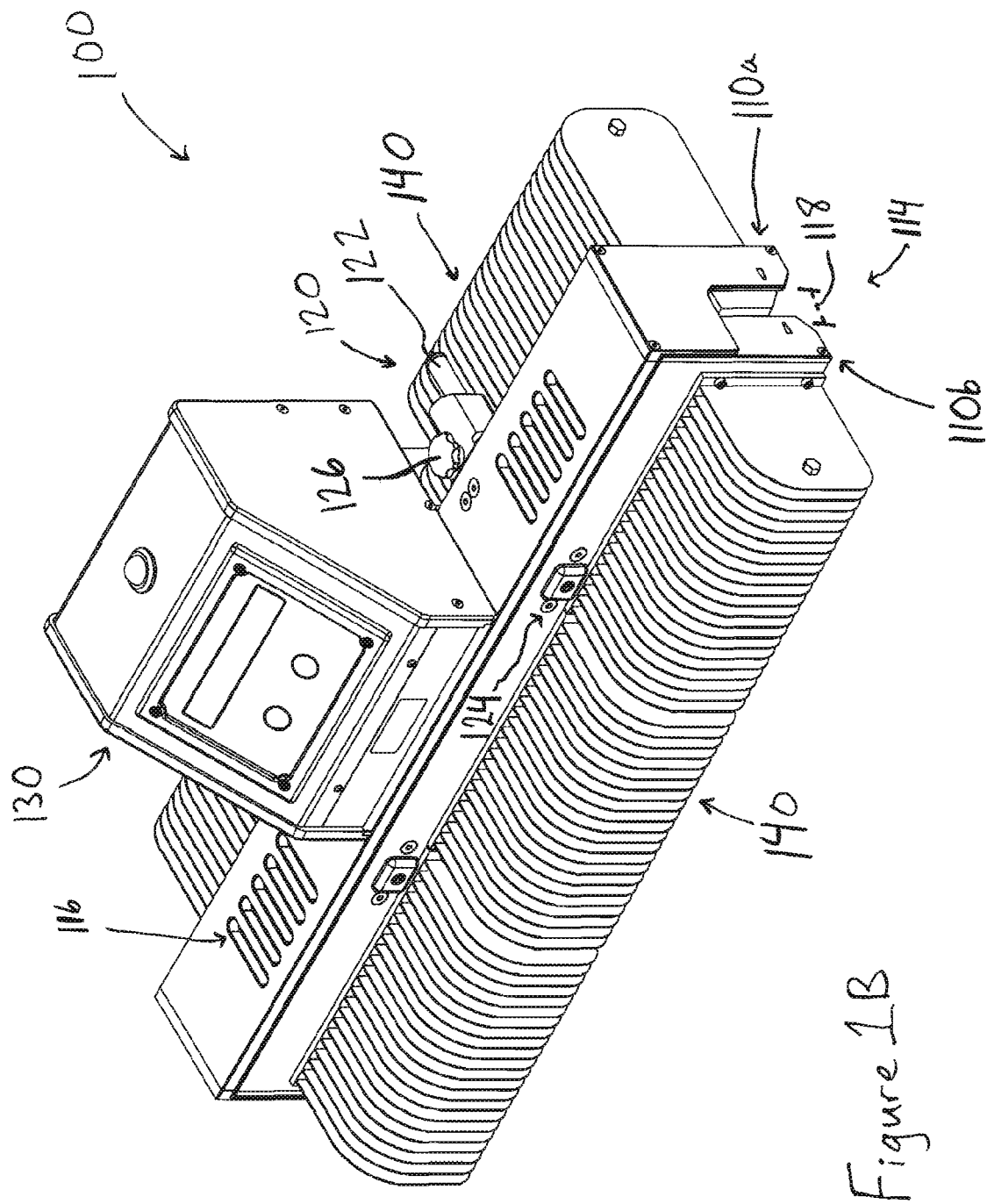
FIG. 1B depicts another perspective of the inductive sealing unit in accordance with a preferred embodiment of the present invention.

FIGS. 1A-B depict an induction sealing unit 100 in accordance with a preferred embodiment of the present invention. The induction sealing unit 100 includes a section 110a, section 110b, and an adjustment mechanism 120. As will be discussed in further detail below, the inductive sealing unit 100 further preferably includes a control unit 130 and cooling mechanisms 140.

The sections 110a-b are adjustably connected by the adjusting mechanism 120 and are capable of generating an electromagnetic field which induces heat sufficient to seal objects, such as containers. The sections 110a and 110b can have housings 112a and 112b, respectively, and can form a channel 114 that extends longitudinal from one end of the sections 110a and 110b to the other end of the sections 110a and 110b. The housings 112a and 112b can include openings 116, such as slots, to allow for ventilation and cooling of the inductive sealing unit 100.

Objects to be sealed, such as containers, can pass through the channel 114 during which an electromagnetic field can induce heat in a seal formed of foil and a heat activated sealing material, such as a polymer film, that becomes tacky when heated to seal the object. The sealing material is preferably molecularly compatible with the object to be sealed. After the heat activated sealing material is sufficiently heated, the seal is cooled and the sealing material bonds the seal to the object. One or both of the sections 110a and 110b can be adjustable with respect to the other. For example, the section 110a can be fixed and the section 110b can be adjusted to move towards and away from the section 110a using the adjusting mechanism 120. Thus, the sections 110a and 110b can be adjusted to vary the width 118 of the channel 114. For example, FIG. 1A shows the inductive sealing unit 100 configured to have a wider channel 114 than that configuration of the inductive sealing unit 100 depicted in FIG. 1B. As a result, the inductive sealing unit 100 can accommodate different sized objects to be sealed.

The adjustment mechanism 120 can allow manual and/or automatic adjustment of one or both of the sections 110a and 110b with respect to the other to accommodate different size objects. The adjustment mechanism preferably includes a positioning member 122 fixedly secured to section 110b and movably attached to section 110a. The positioning member 122 can be fixedly secured to the section 110b using a fastening mechanism 124, such as a screw, bolt, rivet, weld, or the like. A locking mechanism 126 is preferably used to selectively lock the positioning member 122 so that the sections 110a and 110b become fixedly positioned with respect to each other. In some embodiments, the adjustment mechanism 120 can include an actuator discussed below with respect to FIGS. 3 and 4.

The control unit 130 can be co-located with the inductive sealing unit 100 or can be located remote to the inductive sealing unit 100 and can control the intensity of the electromagnetic field generated by the sections 110a-b so that an electromagnetic field strength is selected for sealing objects. The control unit 130 can control a vertical position of the inductive sealing unit 100 to move the inductive sealing unit 100 closer or farther away from a surface, such as a conveyor belt, on which the objects to be sealed are placed. For embodiments that implement an actuator to adjust the sections 110a-b with respect to each other, the control unit 130 can communicate with the actuator to control the actuator.

The cooling mechanisms 140, which in this example are heat sinks, can be used to cool the section 110a-b of the inductive sealing unit 100 to prevent the inductive sealing unit 100 from overheating. The heat sinks are fixed to the sections 110a and 110b using fastening mechanisms 142, such as screws, bolts, rivets, weld, or the like. In other embodiments, the cooling mechanism can be formed from heat sinks, a forced air system, and/or a water cooled system.

FIG. 2 depicts a cross sectional view of the inductive sealing unit 100 to depict the sections 110a-b and the adjustment mechanism 120 in more detail. The sections 110a-b include magnetic flux concentrators 210 (hereinafter "concentrators 210") associated therewith and a flexible conductive coil 220 (hereinafter "coil 220") at least partially disposed with respect to the concentrators 210. A time varying electric current is supplied to the coil 220 to generate an electromagnetic field preferably via the control unit 130. The concentrators 210 intensify the electromagnetic field induced by the time varying current in the coil 220 and prevent the electromagnetic field from undesirable straying.

The concentrators 210 are preferably ferrite cores formed from a ferromagnetic material. The concentrators 210 are preferably configured to have two elongated parallel ends connected by elongated connecting sections that are configured generally orthogonally to the ends so that a cross section of the concentrators 210 generally form C-like shapes. However, those skilled in the art will recognize that the concentrators 210 have a multitude of configuration, such as an E-shape or an I-shaped, and that the above configuration is merely illustrative and is not limiting. The concentrators 210 concentrate the electromagnetic field towards the channel 114 and generally prevent undesirable straying of the electromagnetic field.

The coil 220 is preferably formed from litz wire and is at least a partially disposed with respect to the concentrators 210. Litz wire is formed from multiple individually insulated electrical conductors surrounded by an electrically insulating layer to further insulate the individually insulated conductors. Compared to conventional conductors suitable for use in an inductive sealing unit, litz wire has a low resistance to current flow, which results in power and thermal reductions over convention conductors.

Figure 4:
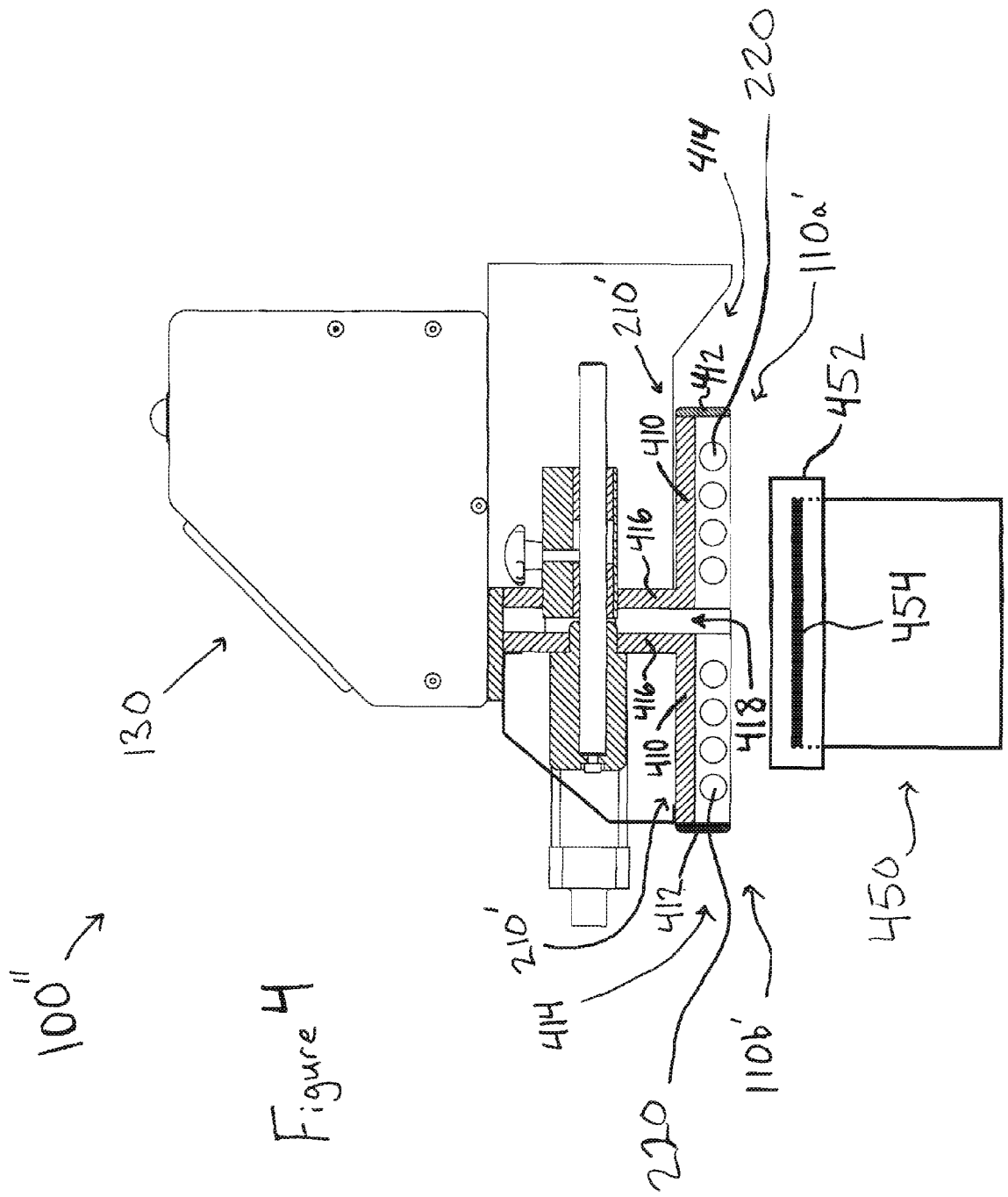
FIG. 4 depicts a cross sectional view of an alternative embodiment of the inductive sealing unit in accordance with the present invention.

The coil 220 can loop between the sections 110a-b such that a bridge section 222 of coil 220 exists between the sections 110a-b. An electric current can be passed through the coil 220 to generate an electromagnetic field. The coil 220 can be arranged in a multitude of configurations. In a preferred embodiment of the present invention, the coil 220 is preferably looped four times so that the sections 110a-b have four coil sections disposed within the cavities formed by the concentrators 210, which are arranged so that adjacently disposed pairs of coil sections can be stacked vertical. The number of loops formed by the coil 220 can vary. In other embodiments, the coil can be arranged so that the coil sections are aligned vertically, horizontally as shown in FIG. 4, or in other suitable arrangements.

When the sections 110a-b are adjusted with respect to each other, so that at least one of the sections 110a-b moves towards or away from the other, the bridge section 222 can bend/flex. For example, as the sections 110a-b are moved away from each other, the bridge section 222 can become increasingly taut and as the sections 110a-b are moved towards each other, the bridge section 222 can become increasing lax.

The positioning member 122 of the adjustment mechanism 120 is preferably formed by a shaft 230. For embodiments that implement the actuator, the shaft 230 can be using mechanisms known to those skilled in the art, such as pneumatically or hydraulically controlled or using a pulley system. The shaft 230 is preferably fixedly attached to section 110b by the fastening mechanism 124, which can be a screw, bolt, weld, or the like, and moveably secured to the section 110a by the locking mechanism 126. The end of the positioning member 122 can include a stopper 232 that prevents position member from allowing the sections 110a-b from being disconnected.

The locking member 126 is preferably formed from a threaded rod section 240 and a knob 242. To lock the shaft 230 so that the sections 110a-b are fixedly secured the knob 242 can be turned so that a distal end 244 of the threaded rod section 240 presses against the shaft 230. In other embodiments, the locking member 126 can be a clamp that clamps the shaft 230 in place, a pin that can extend through one or more holes in the shaft 230, or other suitable mechanisms for fixedly securing the shaft 230 to fixedly position the sections 110a-b with respect to each other.

An object to be sealed, such as container 250, can have a cap 252 to cover an opening in the container. A seal 254, such as foil having one surface coated with a heat activated sealing material, such as a polymer film, is placed over the opening between the container 250 and the cap 252. Since the cap 252 can have a profile which complicates inductive sealing from above the cap 252, the coil 220 is configured to be along one or more sides of the cap so that the coil 220 is in close proximity to the seal 254. The opening of the container 250 and the seal 254 can be passed through the channel 114 of the inductive sealing unit 100. The sections 110a-b can be adjusted so that the seal 254 is in close proximity to the coil 220 thereby exposing the seal 254 to an electromagnetic field sufficient to activate the sealing material on the seal 254. To achieve this, the width 118 of the channel 114 formed by the sections 110a-b is adjusted such that the electromagnetic field induces heat in the seal 254 to a temperature that results in the sealing material of the seal 254 becoming tacky.

FIG. 3 depicts an inductive sealing unit 100' that includes an actuator 300 for adjusting the sections 110a-b with respect to each other so that at least one of the sections 110a-b can be moved towards and away from the other. The inductive sealing unit 100' operates in a similar manner to the inductive sealing unit 100 and includes like components. An end plate 310 has been removed on one end of the inductive sealing unit 100' to show the arrangement of the flexible conductor coil 220 and the bridge section 222.

The actuator 300 is operatively coupled to the positioning member 122 and is communicatively coupled to the control unit 130. The actuator 300 can receive electrical signals from the control unit 130, and can adjust the positioning member 122 in response to the electrical signals from the control unit 130 so that the actuator operates to move one or both of the sections 110a-b towards or away from the other. The actuator 300 can control the positioning member 122 hydraulically, pneumatically, or using a pulley system.

FIG. 4 depicts an alternative embodiment of an inductive sealing unit 100". The inductive sealing unit 100" includes a section 110a', section 110b', and the adjustment mechanism 120. The inductive sealing unit 100" further preferably includes the control unit 130 and actuator 300. The sections 110a' and 110b' are capable of generating an electromagnetic field which induces heat sufficient to seal objects, such as containers, and are adjustably connected by the adjusting mechanism 120.

The sections 110a' and 110b' include magnetic flux concentrators 210' (hereinafter "concentrators 210'") associated therewith and the coil 220' disposed with respect to the concentrators 210'. The concentrators 210' are preferably ferrite cores formed from ferromagnetic materials. The concentrators 210' are preferably configured to have generally planar sections 410 with downwardly depending sections 412 at a first end 414 of the planar sections 410 and upwardly depending sections 416 at a second end 418 of the planar sections 410 such that the sections 412 and 416 are configured generally orthogonal to the planar sections 410. The concentrators 210' are configured to concentrate the electromagnetic field towards an object to be sealed and to prevent undesirable straying of the electromagnetic field.

The coil 220' can loop between the sections 110a' and 110b' such that the bridging section 222 (not shown in FIG. 4) of coil 220' exists between the sections 110a' and 110b'. In this embodiment, the coil 220' is preferably arranged horizontally so that the coil sections are coplanar with respect to each other. When the sections 110a' and 110b' are adjusted with respect to each other using the adjustment mechanism 120, the bridging section 222 can bend/flex.

An object to be sealed, such as container 450, can have a cap 452 to cover an opening in the container 450. The cap 452 can have a generally lower profile than the cap 252 (FIG. 2). A seal 454, such as foil having one surface coated with an sealing material, can be placed over the opening between the container 450 and the cap 452. In this embodiment, the profile of the cap 452 allows the coil 220' to be above the cap to seal the opening of the container with the seal 454. The container 450 can pass under the inductive sealing unit 100" so that the opening of the container 450 and the seal 454 pass in close proximity to the coil 220' of the inductive sealing unit 100". The sections 110a' and 110b' can be adjusted so the sections 110a' and 110b' are sufficiently spaced to induce heat in the seal 454 with an electromagnetic field that is sufficient to seal the opening of the container 450 with the seal 454.

The embodiments of the inductive sealing unit described herein provide a flexible solution for manufacturers that seal containers having different sized caps without requiring the manufacturer to use multiple inductive sealing units. The sections of the inductive sealing unit can simply be adjusted with respect to each other according to the dimensions of the cap. This ensures that the seal comes in close proximity to the coil disposed in the sections so that the seal is heated sufficiently to seal the container. As a result, a single inductive sealing unit can be used to seal a multitude of containers-cap configurations; thereby reducing or eliminating inefficiencies associated with conventional inductive sealing units and eliminating the requirement of purchasing multiple inductive sealing units to seal different container-cap configurations.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed:

1. An inductive sealing unit, comprising:
    a conductive coil assembly comprising:
    (i) at least two sections, at least one of which is adjustable with respect to the other,
    (ii) each of said sections having a magnetic flux concentrator associated therewith, said sections are spaced apart to form a recess having dimensions for receiving at least a portion of an object therein, said sections being moveably adjustable in relation to each other to change the dimensions of said recess to accommodate reception of different size objects to be sealed in said recess by an electromagnetic field
    (iii) a flexible conductive coil looping between said sections and being disposed with respect to said concentrators to provide said electromagnetic field which induces heat sufficient to seal the object and
    (iv) a bridging section of said coil extending between said sections so that said bridging section of said coil is positioned away from said magnetic flux concentrators of said sections, across a width of said recess, said bridging section of said coil flexing or bending to displace the bridging section of said coil to facilitate changing the dimensions of said recess.

2. The inductive sealing unit of claim 1, further comprising:
    an adjustment mechanism for adjusting at least one of said sections with respect to the other.

3. The inductive sealing unit of claim 2, wherein said adjustment mechanism comprises a positioning member secured to one of said sections and movably attached to another of said sections to allow at least one of said sections to move towards or away from the other.

4. The inductive sealing unit of claim 2, wherein said adjustment mechanism further comprises a locking mechanism to selectively lock said positioning member such that said sections are fixedly positioned.

5. The inductive sealing unit of claim 2, wherein said adjustment mechanism comprises:
    a positioning member connecting said at least two sections; and
    an actuator communicatively coupled to said positioning member, said actuator controlling a position of at least one of said sections with said positioning member to move the at least one of said sections towards or away from the other.

6. The inductive sealing unit of claim 5, wherein said adjustment mechanism is at least one of a pneumatic, hydraulic, or pulley device.

7. The inductive sealing unit of claim 1, wherein said recess is a channel.

8. The inductive sealing unit of claim 1, wherein said magnetic flux concentrator comprises a ferrite core.

9. The inductive sealing unit of claim 1, wherein said magnetic flux concentrator has substantially parallel ends and a connecting section that is generally orthogonal to the ends and which connects to the ends to form a cavity in which said flexible conductive coil is disposed.

10. The inductive sealing unit of claim 1, wherein said flexible conductive coil is arranged to be coplanar.

11. The inductive sealing unit of claim 1, wherein said flexible conductive coil is formed with litz wire.

12. A method of inductively sealing different size objects, comprising the steps of:
    providing an inductive sealing unit having at least two sections that are spaced apart to form a recess having dimensions for receiving at least a portion of an object to be sealed, at least one of said sections being adjustable with respect to the other to adjust the dimensions of said recess to accommodate reception of different size objects to be sealed by an electromagnetic field, each of said sections including a magnetic flux concentrator and a flexible conductive coil looping between said sections, said flexible conductive coil being disposed with respect to said concentrators;
    forming a bridging section of said coil extending between said sections so that said bridging section of said coil is positioned away from said concentrators of said sections, across a width of said recess, said bridging section of said coil flexing or bending to displace the bridging section of said coil to facilitate changing the dimensions of said recess;
    adjusting at least one of said sections to move the at least one of said sections towards or away from the other to change the dimensions of said recess, said adjusting positions said sections in a manner to induce heat sufficient to seal said object with known dimensions using said electromagnetic field;
    supplying an electric current to said flexible conductive coil to induce said electromagnetic field with the said sections; and
    sealing said object with the known dimensions based on the electromagnetic field.

13. The method of claim 12, wherein said adjusting is performed manually.

14. The method of claim 12, wherein said adjusting is performed automatically.

15. The method of claim 12, further comprising the steps of:
    readjusting at least one of said sections to move the at least one of said sections towards or away from the other, said readjusting positioning said sections in a manner to induce heat sufficient to seal another object with known dimensions; and
    sealing said other object with the known dimensions based on the electromagnetic field.

16. The method of claim 12, further comprising the step of passing the object under said sections using a conveyer belt, said passing and sealing being performed concurrently.

17. The method of claim 16, wherein said sections form a channel and at least a portion of said object extends into said channel during the step of passing.

18. An inductive sealing unit, comprising:
- at least two sections having electromagnetic field generating capabilities, said sections being spaced apart to form a recess having dimensions for receiving at least a portion of an object to be sealed, at least one of said sections being moveably adjustable with respect to the other, each of said sections including a magnetic flux concentrator associated therewith and a flexible conductive coil looping between said sections, said flexible conductive coil being disposed with respect to said concentrators of said sections to provide an electromagnetic field which induces heat sufficient to seal the object;
- a bridging section of said coil extending between said sections so that said bridging section of said coil is positioned away from said concentrators of said sections, across a width of said recess, said bridging section of said coil flexing or bending to displace the bridging section of said coil to facilitate changing the dimensions of said recess; and
- an adjustment mechanism for adjusting at least one of said sections with respect to the other to allow at least one of said sections to move towards or away from the other to change the dimensions of said recess to accommodate reception of different size objects to be sealed in the recess by said electromagnetic field.

19. The inductive sealing unit of claim 18, wherein said adjustment mechanism comprises a positioning member fixedly secured to one of said sections and movably attached to another of said sections to allow at least one of said sections to move towards or away from the other.

20. The inductive sealing unit of claim 19, wherein said adjustment mechanism comprises a locking mechanism to selectively lock said positioning member such that said sections are fixedly positioned.

21. The inductive sealing unit of claim 18, wherein said adjustment mechanism comprises:
- a positioning member connecting said sections; and
- an actuator communicatively coupled to said positioning member, said actuator controlling a position of at least one of said sections with said positioning member to move the at least one of said sections towards or away from the other.

22. The inductive sealing unit of claim 18, wherein said object is a container having a cap portion, said cap portion being received by said recess so that said cap portion is between said sections and the dimensions of said recess are changed to accommodate reception of said cap portion.

23. The inductive sealing unit of claim 1, wherein said object is a container having a cap portion, said cap portion being received by said recess so that said cap portion is between said sections and the dimensions of said recess are changed to accommodate reception of said cap portion.

24. The method of claim 12, wherein said object is a container having a cap portion, said cap portion being received by said recess so that said cap portion is between said sections and the dimensions of said recess are changed to accommodate reception of said cap portion.

* * * * *